US010005658B2

(12) United States Patent
Lee

(10) Patent No.: US 10,005,658 B2
(45) Date of Patent: Jun. 26, 2018

(54) WATER DISPENSER AND DETACHABLE WATER CONTAINER WITH LATERAL CONNECTOR CONNECTED THERETO

(71) Applicant: Wen-Ching Lee, Taichung (TW)

(72) Inventor: Wen-Ching Lee, Taichung (TW)

(*) Notice: Subject to any disclaimer, the term of this patent is extended or adjusted under 35 U.S.C. 154(b) by 0 days. days.

(21) Appl. No.: 14/910,113

(22) PCT Filed: Nov. 11, 2014

(86) PCT No.: PCT/CN2014/000990
§ 371 (c)(1),
(2) Date: Feb. 4, 2016

(87) PCT Pub. No.: WO2015/066969
PCT Pub. Date: May 14, 2015

(65) Prior Publication Data
US 2016/0176698 A1  Jun. 23, 2016

(30) Foreign Application Priority Data
Nov. 11, 2013  (CN) .................... 2013 2 0709353 U

(51) Int. Cl.
*B67D 7/84*   (2010.01)
*B67D 3/00*   (2006.01)
(Continued)

(52) U.S. Cl.
CPC ............ *B67D 3/0061* (2013.01); *A47J 31/44* (2013.01); *A47J 31/4407* (2013.01); *A47J 31/46* (2013.01);
(Continued)

(58) Field of Classification Search
CPC ...... B67D 3/0061; A47J 31/44; A47J 31/4407; A47J 31/46; A47J 31/605; C02F 1/003;
(Continued)

(56) References Cited

U.S. PATENT DOCUMENTS 3,416,577 A * 12/1968 Franz .................... B67C 3/2637
                                                                141/117
3,972,387 A *  8/1976 Braun ....................... F04B 9/14
                                                               137/614.04
(Continued)

FOREIGN PATENT DOCUMENTS

CN         2931199     8/2007
CN       202144329    2/2012
(Continued)

*Primary Examiner* — Benjamin R Shaw
(74) *Attorney, Agent, or Firm* — Muncy, Geissler, Olds & Lowe, P.C.

(57) ABSTRACT

A water dispenser includes a main body and a water container. The main body has a receiving space and a connecting socket. The water container includes a container body and a water dispenser connector. The container body has a receiving chamber for storing a liquid. The water dispenser connector is connected to the container body and located at a bottom portion of the container body. When the water container is mounted in the receiving space of the main body, with the water dispenser connector connected to the connecting socket of the main body, the liquid in the receiving chamber of the container body can flow through the water dispenser connecter to the connecting socket of the main body. Once the water container is detached from the main body, the water dispenser connector stops the liquid from flowing out of the receiving chamber of the container body.

9 Claims, 5 Drawing Sheets

(51) Int. Cl.
*A47J 31/44* (2006.01)
*C02F 1/00* (2006.01)
*A47J 31/46* (2006.01)
*A47J 31/60* (2006.01)

(52) U.S. Cl.
CPC ............. *A47J 31/605* (2013.01); *C02F 1/003* (2013.01); *C02F 2307/04* (2013.01); *C02F 2307/10* (2013.01)

(58) Field of Classification Search
CPC . C02F 2307/04; C02F 2307/10; B67C 3/2637
USPC .................. 222/173, 185.1, 325, 505, 509
See application file for complete search history.

(56) References Cited

U.S. PATENT DOCUMENTS

| | | | | | |
|---|---|---|---|---|---|
| 4,109,650 | A | * | 8/1978 | Peclard | A61C 1/0084 222/162 |
| 4,986,448 | A | * | 1/1991 | Takahashi | B67D 3/043 222/129.1 |
| 5,209,377 | A | * | 5/1993 | Steiner | A47K 5/1209 222/189.09 |
| 5,483,616 | A | * | 1/1996 | Chiu | F24F 6/043 261/107 |
| 5,706,985 | A | * | 1/1998 | Feer | B67D 3/00 222/185.1 |
| 5,791,526 | A | * | 8/1998 | Landais | A47J 31/404 222/185.1 |
| 6,092,570 | A | * | 7/2000 | Densel | F01M 11/0408 141/353 |
| 6,103,114 | A | * | 8/2000 | Tanner | C02F 1/003 210/232 |
| 6,158,486 | A | * | 12/2000 | Olson | B65D 23/10 141/351 |
| 6,202,717 | B1 | * | 3/2001 | Markey | B67D 7/0294 141/311 R |
| 6,325,115 | B1 | * | 12/2001 | Cowland | A01K 5/02 141/346 |
| 6,390,156 | B1 | * | 5/2002 | Hetherington | A23G 9/045 141/2 |
| 6,708,741 | B1 | * | 3/2004 | Berry | B67D 3/0009 141/351 |
| 7,299,956 | B2 | * | 11/2007 | Haglund | B67D 3/0032 141/364 |
| 2004/0089375 | A1 | * | 5/2004 | Falligant | A61M 16/183 141/351 |
| 2005/0103721 | A1 | * | 5/2005 | Fritze | C02F 1/003 210/744 |
| 2006/0191824 | A1 | * | 8/2006 | Arett | A47G 19/12 210/85 |
| 2006/0231476 | A1 | * | 10/2006 | Vandenbelt | C02F 1/003 210/266 |
| 2006/0280664 | A1 | * | 12/2006 | Huang | A61L 2/035 422/292 |
| 2007/0204931 | A1 | * | 9/2007 | Freed | A61M 16/186 141/351 |
| 2009/0025826 | A1 | * | 1/2009 | Meuleners | F25D 23/126 141/351 |
| 2010/0276376 | A1 | * | 11/2010 | Moretto | C02F 1/003 210/739 |
| 2011/0081466 | A1 | | 4/2011 | Lassota | |
| 2014/0083924 | A1 | * | 3/2014 | Bergendal | C02F 1/003 210/451 |

FOREIGN PATENT DOCUMENTS

| | | |
|---|---|---|
| CN | 202775870 | 3/2013 |
| CN | 203619242 | 6/2014 |

* cited by examiner

WATER DISPENSER AND DETACHABLE WATER CONTAINER WITH LATERAL CONNECTOR CONNECTED THERETO

BACKGROUND OF THE INVENTION

1. Technical Field

The present invention relates to drinking water equipment and more particularly to a water dispenser and a water container thereof.

2. Description of Related Art

Water dispensers are widely used in workplaces, homes, and public areas because of their advantageous features such as convenience of use, cleanliness, and hygiene. Some water dispensers on the market nowadays use bottled water as the water source, whereas those mounted with an internal filter can use tap water directly. In either case, however, a water dispenser must have a water tank or water reservoir installed in its main body. The water tank is an integral part of the main body of the water dispenser and therefore cannot he detached from the main body. In other words, the water tank of a conventional water dispenser serves only to store water and is not designed to be used independently of the water dispenser, e.g., as a water holder from which water can be directly consumed. Moreover, due to its inseparability from the main body of the water dispenser, the water tank is difficult to clean, and maintenance of the water tank can be a problem.

BRIEF SUMMARY OF THE INVENTION

In view of the drawbacks stated above, the present invention provides a water dispenser and a water container thereof; wherein the water container not only can be connected to the water dispenser, serving as a water tank of the water dispenser, but also can be used separately.

To achieve the foregoing objective, the water dispenser of the present invention includes a main body and a water container. The main body has a receiving space and a connecting socket. The water container includes a contain body and a water dispenser connector. The container body has a receiving chamber for storing a liquid. The water dispenser connecter is connected to the container body and located at a bottom portion of the container body. When the water container is mounted in the receiving space of the main body, and the water dispenser connecter of the water container is connected with the connecting socket of the main body, the liquid in the receiving chamber of the container body can flow through the water dispenser connecter to the connecting socket of the main body. Once the water container is detached from the main body, however, the water dispenser connecter stops the liquid from flowing out of the receiving chamber of the container body.

To achieve foregoing objective, the present invention also provides a water container which can be mounted to and detached from the main body of a water dispenser. The water container includes a container body, a water dispenser connector, a filter base, a filter, and a lid. The container body has a receiving chamber. The water dispenser connector is connected to the container body and located at a bottom portion of the container body. The filter base is connected to the container body and located in the receiving chamber of the container body, and has a filter chamber. The filter is connected to the filter base and located in the filter chamber. The lid is covered on the container body and located at a top portion of the container body.

Since the water container of the present invention can be used alone as well as assembled to the main body of the water dispenser, cleaning maintenance, and use of the water container are easier than those of the prior art water tanks. Further, when the water container of the present invention is used alone, the water dispenser connector of the water container is sealed to keep the liquid in the receiving chamber of the container body from flowing out of the water dispenser connector.

In addition, the filter in the water container of the present invention can filter tap water to produce drinking water, which is isolated from the tap water by the filter base so that the user can consume the clean drinking water directly.

The structures, features, assembly method, and use of the water dispenser and water container of the present invention will be elucidated in the DETAILED DESCRIPTION OF THE INVENTION section that follows. As a person of ordinary skill in the art would understand, the detailed description and the specific embodiment provided herein are for illustrative purposes only and are not intended to be restrictive of the scope of the invention.

DETAILED DESCRIPTION OF THE INVENTION

Figure 1:
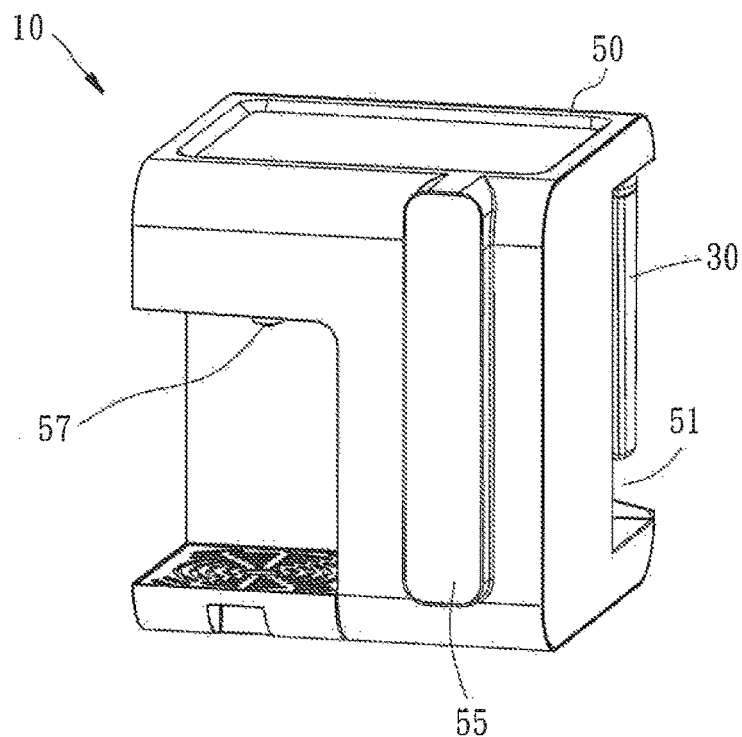
FIG. 1 is a perspective view, from a first viewing angle, of the water dispenser in an embodiment of the present invention.

The components and effects of the water dispenser and water container of the present invention are described below with reference to the preferred embodiment depicted in the drawings. Please note that the components, dimensions, and appearances of the water dispenser and of the water container in the drawings serve only to demonstrate the technical features of the present invention and do not impose limitations on the invention.

Figure 2:
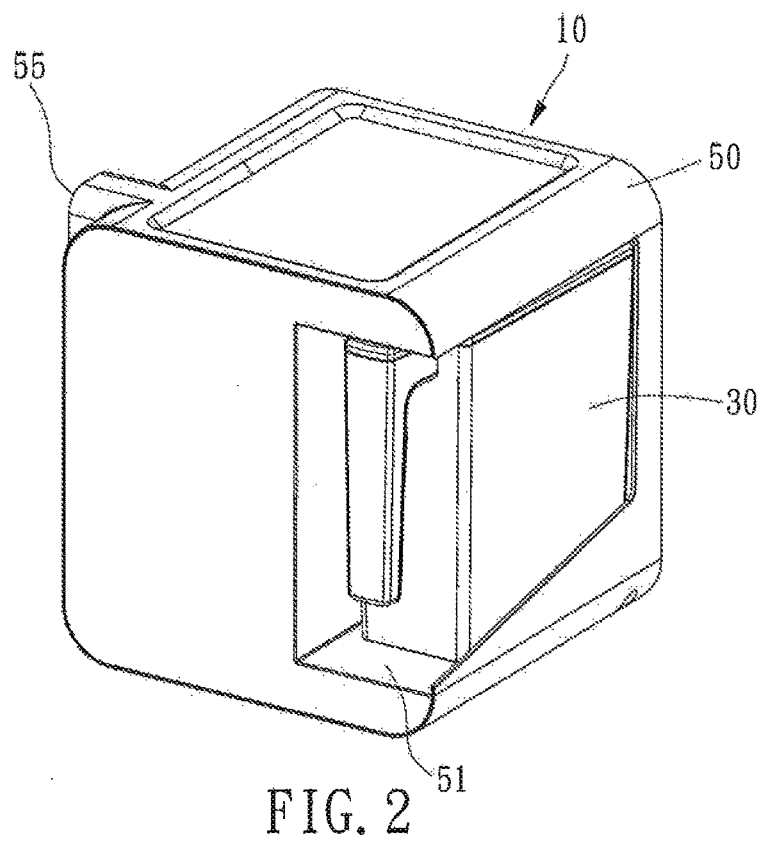
FIG. 2 is a perspective view, from a second viewing angle, of the water dispenser in FIG. 1.
Figure 3:
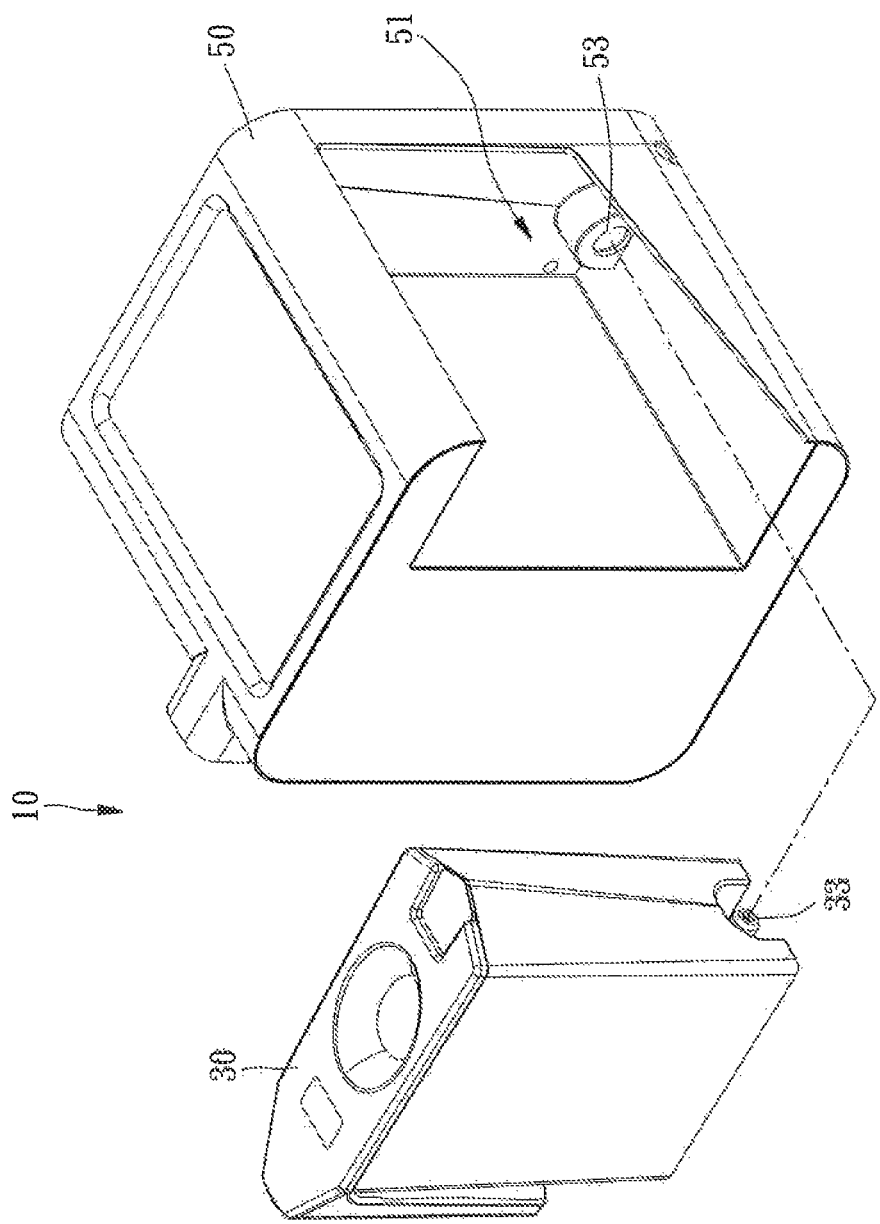
FIG. 3 shows how the water container is detached from e water dispenser in FIG. 2.

Referring to FIG. 1 to FIG. 3, the water container 30 of the present invention can be mounted to and detached from the main body 50 of a water dispenser 10. That is to say, the water container 30 not only can be assembled to the main body 50 of the water dispenser 10 in place of a conventional water tank, but also can be used alone when detached.

The main body 50 has a receiving space 51 and a connecting socket 53. The front side of the main body 50 of the water dispenser 10 is provided with a control panel 55 and a water outlet 57. The control panel 55 can be a touch panel or a combination of pushbuttons and a display but is not limited to the foregoing, The water outlet 57 of the main body 50 is connected to the connecting socket 53. In fact, there are a plurality of devices between the water outlet 57 and the connecting socket 53, including a water pump, a heater, a cryostat, and so on. Since these devices are well known in the art of water dispensers, they will not be dealt with herein. The water container 30 can be used in two modes: either alone or in conjunction with the main body 50, the former mode of which is explained first, as follows, Referring to FIG. 4 to FIG. 6, the water container 30 includes a container body 31 and a water dispenser connector 33. The container body 31 has a receiving chamber 311 for storing a liquid. The liquid in this embodiment is tap water and drinking water by way of example. The water dispenser connector 33 is connected to the container body 31, approaching a bottom portion of the container body 31, and configured to connect with the connecting socket 53 of the main body 50 (see FIG. 8).

Figure 4:
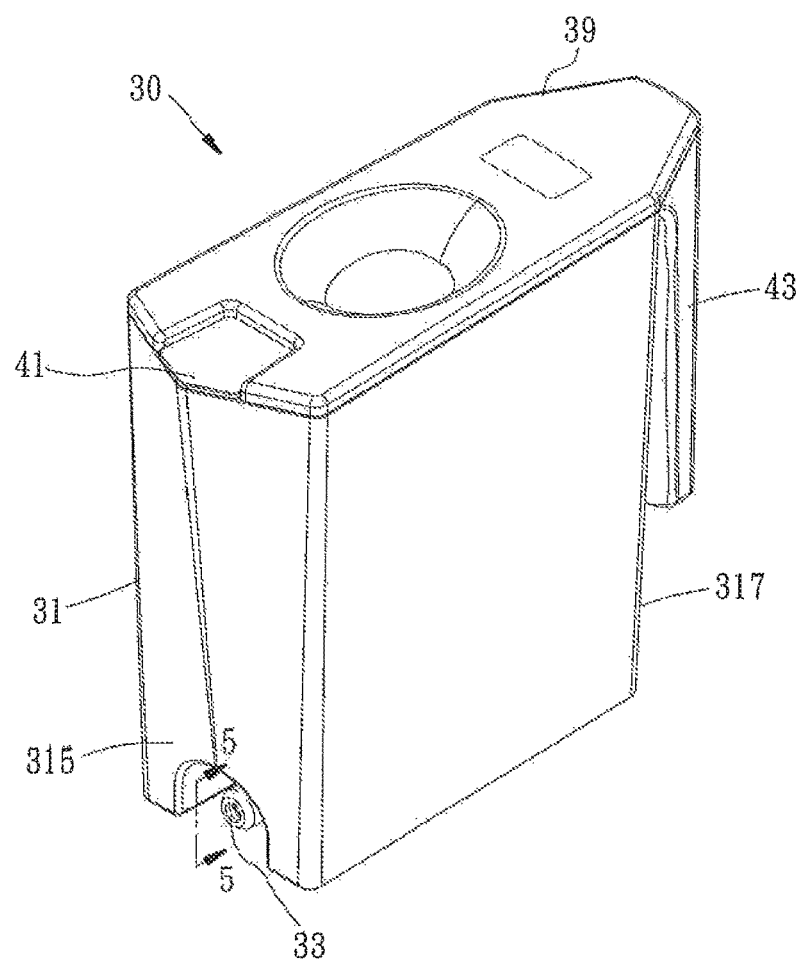
FIG. 4 is a perspective view of the water container in FIG. 3.
Figure 5:
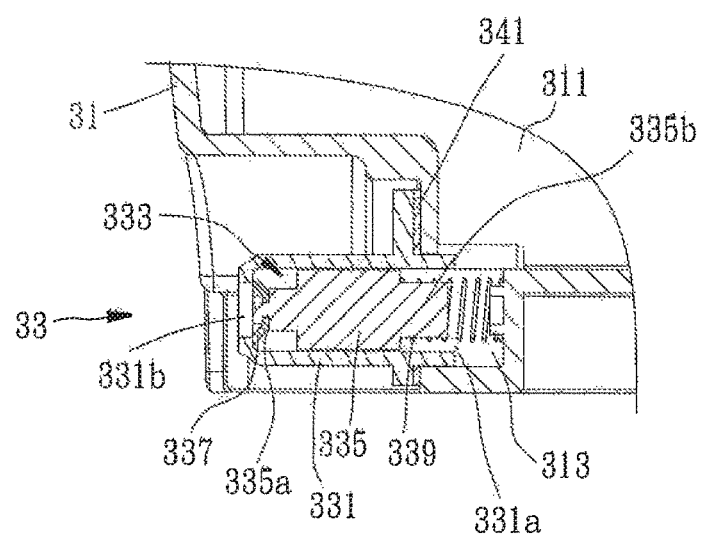
FIG. 5 is a partial sectional view taken along the line 5-5 in FIG. 4.

As shown in FIG. 5, which is an enlarged sectional view taken of the water container 30 in FIG. 4 along the line 5-5, the container body 31 further includes a groove 313 in communication with the receiving chamber 311 of the container body 31. The water dispenser connector 33 of the water container 30 includes a water outlet tube 331 and a stopping unit 333. The water outlet tube 331 is connected to the container body 31 and has an inlet 331a in communication with the groove 313 of the container body 31 and an outlet 331b in communication with the inlet 331a. The stopping unit 333 is connected in the water outlet tube 331 and the groove 313 of the container body 31 and is located at a stopping position, where the stopping unit 333 blocks the outlet 331b of the water outlet tube 331 to keep drinking water from flowing out of the outlet 331b of the water outlet tube 331.

The stopping unit 333 includes a push rod 335, a sealing cover 337, and a spring 339. The push rod 335 has a front end 335a and a rear end 335b. The sealing cover 337 is connected to the push rod 335 and located at the front end 335a of the push rod 335. The spring 339 is connected to the push rod 335 and located at the rear end 335b of the push rod 335. When the spring 339 is in a released state, the stopping unit 333 is located at the stopping position (see FIG. 5). When the spring 339 is in a compressed state, the stopping unit 313 is away from the stopping position (see FIG. 8).

The water dispenser connector 33 of the water container 30 further includes a hollow washer 341 located between the water outlet tube 331 and the container body 31 to prevent leakage of water through the gap between the water outlet tube 331 and the container body 31. It is worth mentioning that the hollow washer 341 between the water outlet tube 331 and the container body 31 in this embodiment can be dispensed with if the water outlet tube 331 and the container body 31 are integrally formed.

Thanks to the aforementioned structures of the water container 30, the water dispenser connector 33 can effectively stop a liquid from flowing out of the receiving chamber 311 of the container body 31 once the water container 30 is detached from the main body 50. In short, a liquid cannot flow out of the water dispenser connector 33 of the container body 31 when the water container 30 is used separately.

Figure 6:
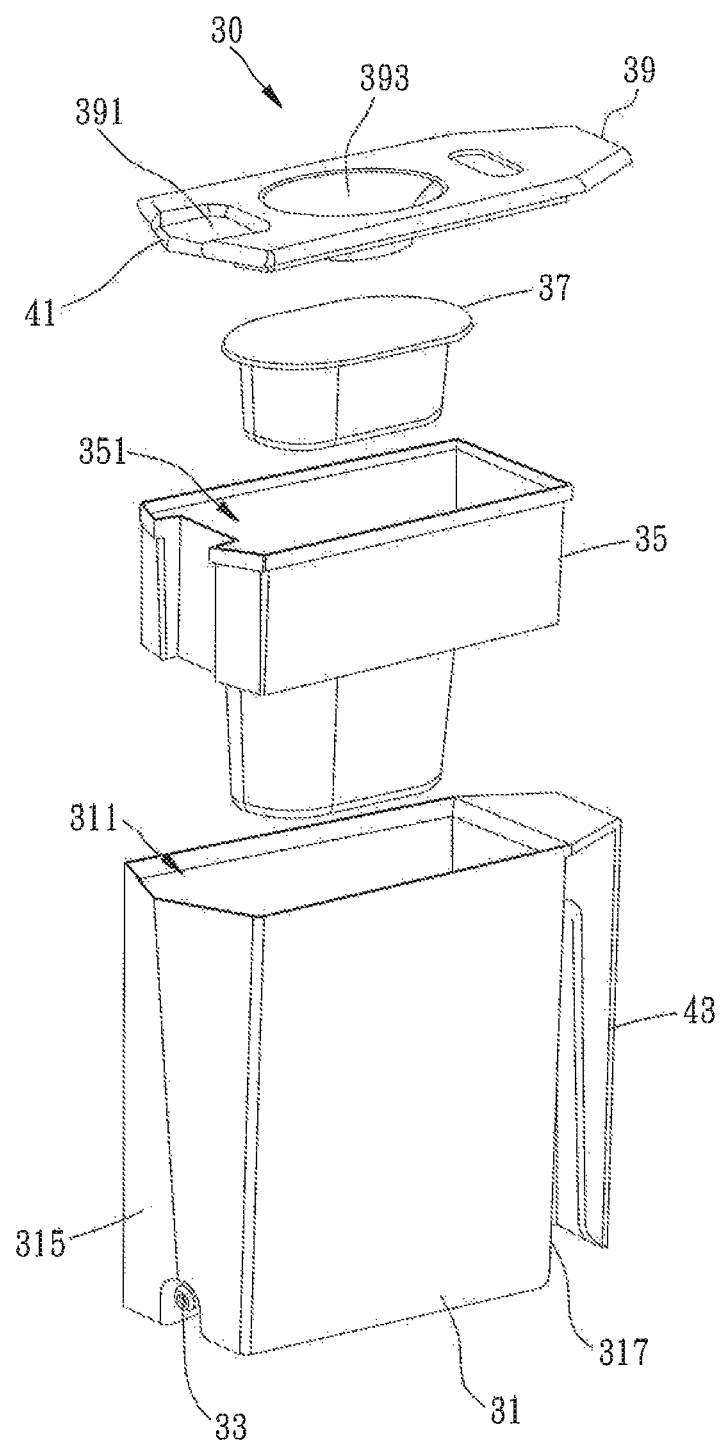
FIG. 6 is an exploded view of the water container in FIG. 4.

Referring to FIG. 6, the water container 30 further includes a filter base 35, a filter 37, and a lid 39. The filter base 35 is connected to the container body 31, and located in the receiving chamber 311, and has a filter chamber 351. The filter 37 is connected to the filter base 35 and located in the filter chamber 351 of the filter base 35. The lid 39 covers the container body 31 and is located at a top portion of the container body 31. The filter 37 can filter tap water to produce drinking water, with the filter base 35 separating the tap water from the drinking water. More specifically, tap water is stored in the filter chamber 351 while drinking water enters the receiving chamber 311 through the filter 37. The lid 39 prevents dust and Wastes from entering the water container 31, The lid 39 has a container opening 391 and a water receiving opening 393. The container opening 391 is provided at an edge of the lid 39. The water receiving opening 393 is provided at a central portion of the lid 39 to allow injection of tap water into the filter chamber 351. The water container 31 further has a container opening cover 41 pivotally connected to the lid 39 and covered on the container opening 391 of the lid 39. The container opening cover 41 also serves to keep out dust and wastes.

To facilitate use, the water container 30 further includes a handle 43. More specifically, the container body 31 has a front side 315 and a rear side 317, and the handle 43 is connected to the container body 31 and located at the rear side 317 of the container body 31. Meanwhile, the water dispenser connector 33 is located at the front side 315 of the container body 31. Therefore, a user can hold the water container 30 easily by grasping the handle 43 of the water container 30.

The mode in which the water container is used alone has been detailed above. The following paragraphs describe how the water container and the main body of the water dispenser are put together and how they are used in the assembled state.

Figure 7:
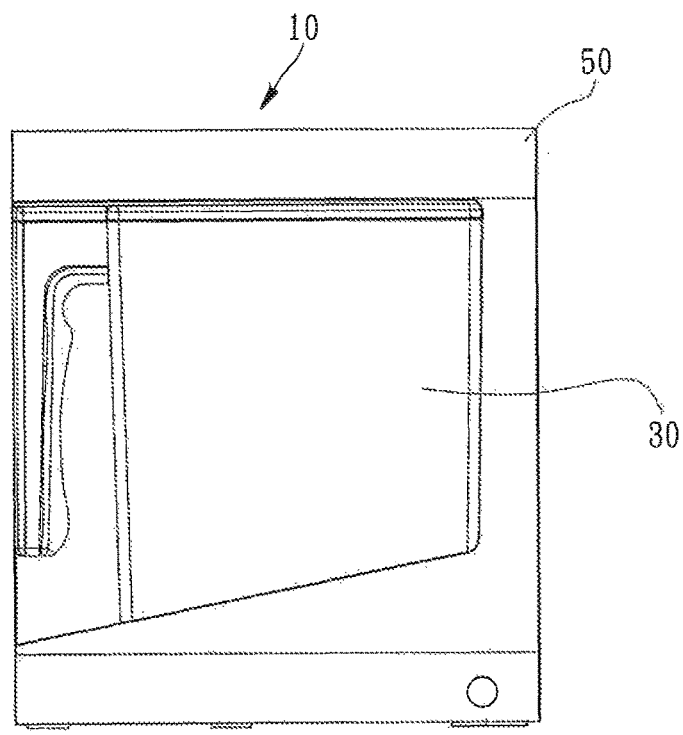
FIG. 7 is a rear view of the water dispenser in FIG. 2.
Figure 8:
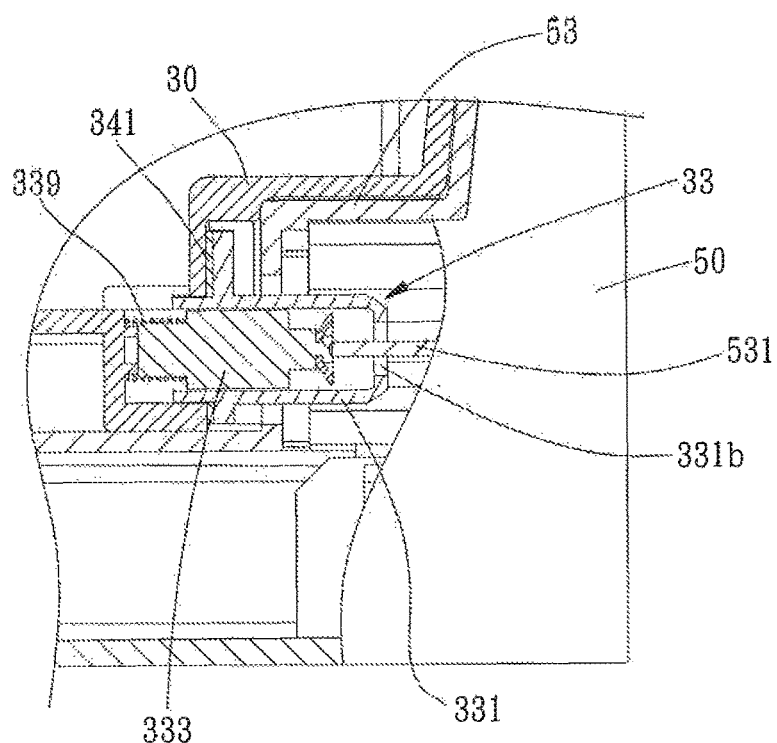
FIG. 8 is a partial sectional view taken from FIG. 7.

Referring to FIG. 7 and FIG. 8, the water container 30 is mounted in the receiving space 51 of the main body 50, with the water dispenser connector 33 of the water container 30 connected with the connecting socket 53 of the main body 50 so that the liquid in the receiving chamber 311 of the container body 31 can flow to the connecting socket 53 of the main body 50 via the water dispenser connector 33. The drinking water in the water container 30 can be released from the water outlet 57 of the main body 50 by operating the control panel 55 in FIG. 1.

When the water dispenser connector 33 of the water container 30 is connected to the connecting socket 53 of the main body 50, referring to FIG. 8, a tongue 531 of the connecting socket 53 is inserted into the outlet 331b of the water outlet tube 331 to push the stopping unit 333 away from the stopping position and compress the spring 339, thereby allowing the drinking water in the water container 30 to flow to the connecting socket 53.

Please note that the structures of the connecting socket 53 and of the water dispenser connector 33 are not limited to and may therefore be different from those disclosed in this embodiment.

It should be pointed out again that the components disclosed in the foregoing embodiment are for illustrative purposes only and are not restrictive of the scope of the present invention. All equivalent substitutions and variations of the disclosed components should fall within the scope of the invention.

What is claimed is:
1. A water dispenser, comprising:
a main body having a receiving space and a lateral socket; and
a water container comprising a container body and a lateral connector, the container body having a plurality of sidewalls extending upwardly to form a receiving chamber for storing a liquid, one of the sidewalls comprising a ridgeline, the lateral connector being connected to the container body and approaching a bottom portion of the container body, the ridgeline being extended to form a top rim of the sidewall to near the lateral connector wherein when the water container is mounted in the receiving space of the main body, and the lateral connector of the water container is connected with the lateral socket of the main body, the liquid in the receiving chamber of the container body is able to flow through the lateral connector to the lateral socket of the main body, and when the water container is detached from the main body, the lateral connector stops the liquid from flowing out of the receiving chamber of the container body, wherein the water container further comprises a filter base, a filter, and a lid; the filter base is connected to the container body and located in the receiving chamber, and has a filter chamber; the filter is connected to the filter base and located in the filter chamber; the lid covers the container body and is located at a top portion of the container body.

2. The water dispenser of claim 1, wherein the lateral connector of the water container comprises a water outlet tube and a stopping unit, the water outlet tube is connected to the container body and has an inlet and an outlet in communication with the inlet, the inlet is in communication with the receiving chamber of the container body, the stopping unit is connected in the water outlet tube and located at a stopping position to block the outlet of the water outlet tube, and the lateral socket of the main body pushes the stopping unit of the lateral connector away from the stopping position when the water container is mounted into the receiving space of the main body.

3. The water dispenser of claim 2, wherein the stopping unit comprises a push rod, a sealing cover, and a spring; the push rod has a front end and a rear end; the sealing cover is connected to the push rod and located at the front end of the push rod; and the spring is connected to the push rod and located at the rear end of the push rod so that when the spring is in a released state, the stopping unit is located at the stopping position, and when the spring is in a compressed state, the stopping unit is away from the stopping position.

4. The water dispenser of claim 2, wherein the lateral connector of the water container further comprises a hollow washer located between the water outlet tube and the container body.

5. The water dispenser of claim 1, wherein the water container further has a container opening cover, the lid has a container opening and a water receiving opening, the container opening is provided at an edge of the lid, the water receiving opening is provided at a central portion of the lid, the container opening cover is connected to the lid and covered on the container opening.

6. The water dispenser of claim 1, wherein the water container further comprises a handle, the handle is connected to the container body and located at opposite the ridgeline.

7. A water container lateral mountable to and detachable from a main body of a water dispenser, comprising:
   a container body having a plurality of sidewalls being extending upwardly to form a receiving chamber, one of the sidewalls comprising a ridgeline;
   a lateral connector connected to the container body and approaching a bottom portion of the container body, the ridgeline extended to form a top rim of the sidewall to near the lateral connector;
   a filter base connected to the container body and located in the receiving chamber, and having a filter chamber;
   a filter connected to the filter base and located in the filter chamber; and
   a lid covered on the container body and located at a top portion of the container body.

8. The water container of claim 7, further comprising a handle, the handle being connected to the container body and located at opposite the ridgeline.

9. The water container of claim 7, further comprising a container opening cover, the lid having a container opening and a water receiving opening, the container opening being provided at an edge of the lid, the water receiving opening being provided at a central portion of the lid, the container opening cover being connected to the lid and covered on the container opening.

* * * * *